Patented Mar. 30, 1937

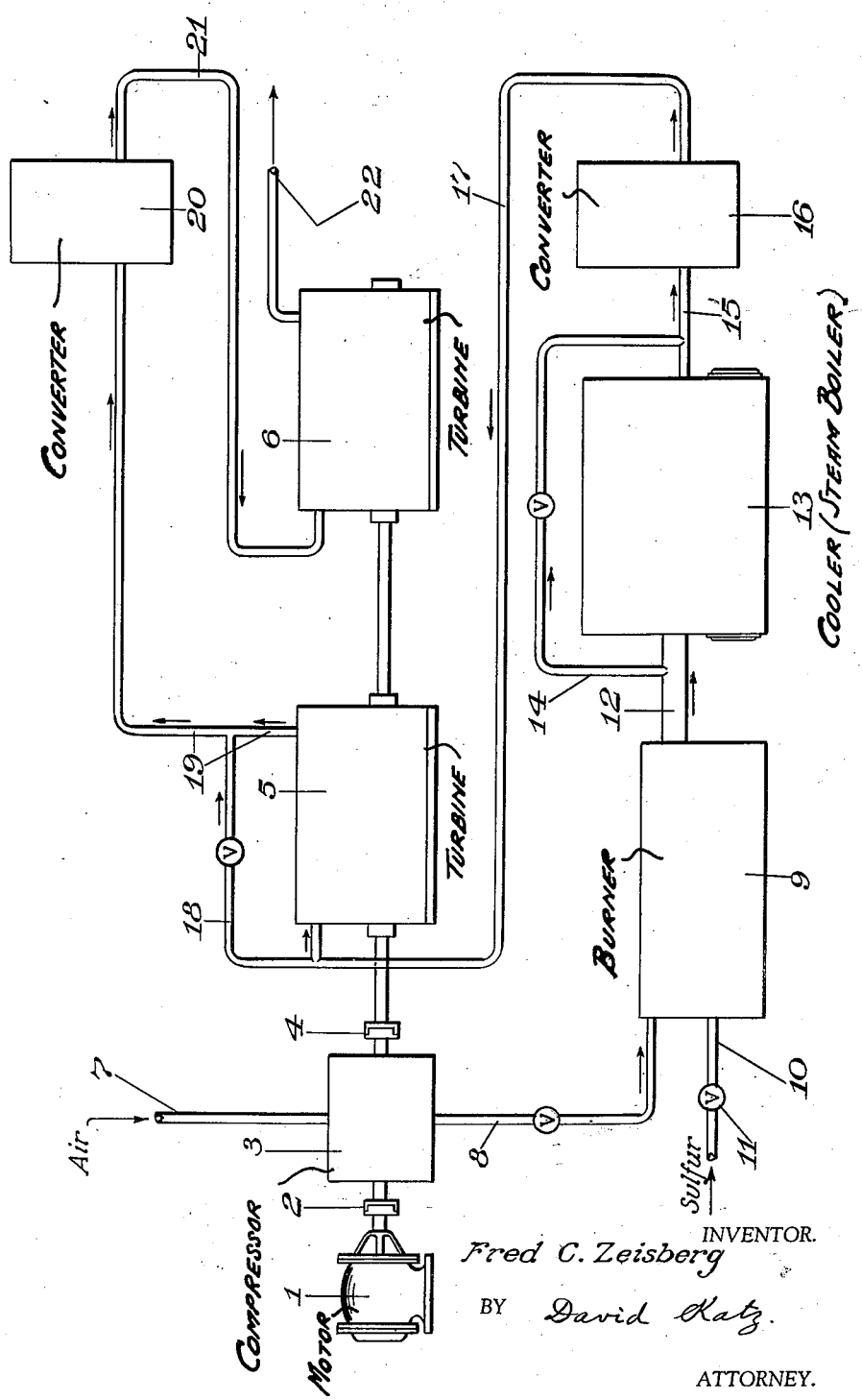

2,075,075

UNITED STATES PATENT OFFICE 2,075,075

METHOD AND APPARATUS FOR THE MANUFACTURE OF SULPHURIC ACID

Fred C. Zeisberg, Wilmington, Del., assignor to E. I. du Pont de Nemours & Company, Wilmington, Del., a corporation of Delaware Application August 13, 1935, Serial No. 35,937

9 Claims. (Cl. 23—176)

This invention relates to an improved process for the manufacture of sulphuric acid by the contact process. More particularly this invention relates to a novel method and apparatus for controlling the temperature of the gases entering each converter in a multi-stage system of converting sulphur dioxide gases to sulphur trioxide.

When sulphur dioxide and oxygen (air) are brought in contact with a catalyst at a suitable temperature the dioxide is oxidized to trioxide. This reaction is accompanied by an evolution of heat which raises the temperature of the reacting gases. In a completely insulated reaction vessel this rise in temperature amounts to 18° C. for every 10% of the $SO_2$ originally present converted to $SO_3$, in a gas containing 6% $SO_2$; and 35° C. for every 10% of the $SO_2$ originally present converted to $SO_3$, in a gas containing 12% $SO_2$.

Since it is generally necessary to heat the gas to at least around 350° C. in order to initiate the reaction it is obvious that very high temperatures are encountered in the process. Such high temperatures are objectionable for several reasons. In the first place they may have an injurious effect on the catalyst. In the second place, owing to the fact that the amount of $SO_3$ which can exist in the equilibrium

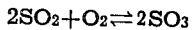

$$2SO_2 + O_2 \rightleftharpoons 2SO_3$$

falls with rising temperature, it is impossible to approach complete conversion of $SO_2$ in practice unless some or nearly all of the heat of reaction is removed before the gas is brought out of contact with the catalyst.

These well-understood phenomena have stimulated the invention of many processes for controllably removing the heat generated in the reaction. Generally, these processes involve effecting the conversion in several stages, the gases being cooled as they pass from one stage to another, whereby the temperature of the gas is reduced to the optimum for the particular stage as it enters each converter. In general, however, large heat transfer surfaces and bulky pieces of apparatus are required because of the slowness with which heat is transferred from a gas to a cooling surface.

It is also known that the efficiency of conversion is higher if it be carried out at superatmospheric pressure. However, no practical system for conversion under pressure has been developed to date, in view of the requirement of bulky cooling apparatus between stages, as already noted above, and because of the expense of compression.

It is accordingly an object of my invention to provide a process and apparatus for cooling the converter gases between stages, which are characterized by high efficiency and compactness of apparatus. It is a further object of my invention to provide an improved process for converting sulphur dioxides gases into sulphur trioxide under superatmospheric pressure, whereby this process may become applicable on a commercial scale. It is a further object of my invention to provide a process and apparatus for cooling the converter gases between stages or after the final stage, whereby the major part of the heat removed from the gases is transformed into useful energy, and may be utilized to create the pressure requisite for conversion under pressure. Other and further important objects of this invention will appear as the description proceeds.

Briefly stated, my invention consists in compressing the gas mixture to be converted, either by feeding compressed air into the sulphur burner or by compressing the $SO_2$-air mixture formed in the burner, prior to its entry into the converters. This compressed gas then has its temperature brought to the proper point; namely, about 350° C. for an active platinum catalyst, or somewhat higher, say about 400° C. for a less active vanadium catalyst, and is entered into an insulated converter. Here some conversion occurs, accompanied by a rise in temperature. The hot exit gas from this converter is then passed to an expansion engine, where by dropping the pressure on the gas mixture a proper amount, the temperature of the gas is brought down to the point where it can be entered into a second insulated converter. In this, because of the favorable temperature, a further amount of conversion occurs. The excess heat can be removed by again passing the gas through an expansion engine, and the conversion completed in a final converter.

This method of operation removes the internal heat of the gas in the form of external work. The amount of power recovered is theoretically sufficient to compress the gas, or the air used to burn the sulphur to produce the gas, provided the gas, when brimstone is burned, contains a maximum of about 10% $SO_2$ by volume. As the concentration of $SO_2$ in the gas decreases, the ratio of the amount of power theoretically recoverable to power theoretically required to compress the gas increases sharply, so that when an 8% gas, for example, about 50% more power is recovered by expansion than is required for compression. This has the practical significance that, taking the mechanical efficiency of compressors and expanders into account, operation of my process on an 8% gas can be carried on without the consumption of any external power.

As an example of one method of carrying out my process, reference is made to the accompanying drawing, which is hereby made part of this disclosure.

This drawing shows diagrammatically a flow-sheet of apparatus, reduced to its simplest elements, suitable for carrying out my invention. The assembly 1, 2, 3, 4, 5, 6 represents, respectively, a motor, a clutch, a multi-stage high-pressure blower, another clutch, and two expansion turbines, all mounted in line on the same shaft, except where the shaft is interrupted by the clutches 2 and 4. Air at atmospheric pressure is supplied through line 7 to the compressor 3. It may be dried and filtered, if desired. The compressed air from the compressor passes through valved line 8 to a liquid sulphur burner 9. Sulphur is supplied to 9 through line 10 equipped with a regulating valve 11. Hot burner gas is discharged from the burner 9 through line 12 to a cooler 13. Around 13 a valved by-pass 14 is provided. From 13 the gas, cooled to the desired temperature, flows through line 15 to a converter 16, equipped with a suitable catalyst. In 16 a considerable amount of $SO_2$ is oxidized to $SO_3$ and a rise in temperature occurs. The hot exit gas, still at essentially the pressure produced by the compressor 3, leaves the converter 16 through line 17 and enters the expansion turbine 5. In its passage through 5 the gas expands and cools. Around 5 a valved by-pass 18 is provided. The expanded gas leaves 5 through line 19 and enters a second converter 20, where further conversion of $SO_2$ to $SO_3$, and a second rise in temperature, occur. The exit gas from this converter passes through line 21 to expansion turbine 6, and is expanded to approximately atmospheric pressure. The exit gas from this turbine is passed through line 22 to an absorption system of the usual type, where it is absorbed in sulphuric acid.

To start the process, clutch 4 is disconnected, clutch 2 is connected and motor 1 is started. This puts compressor 3 into operation. By means of the valve on line 8 a regulated amount of compressed air, at 5 atmospheres, absolute, for the sake of example, is admitted to the burner 9. By opening valve 11, molten sulphur is admitted through line 10 to the burner, and is ignited. By suitable regulation of the valves on lines 8 and 10, the air and sulphur are adjusted to give an $SO_2$ gas of desired strength, say 8% by volume. This gas, which is at a high temperature, passes through 12 to a cooler 13, which may be a steam boiler, if desired. (See U. S. Patent No. 1,545,381.) In this cooler the gas is cooled to, say, 250° C. By means of the valved by-pass 14 hot gas is passed around cooler 13 in such amount as to raise the temperature of the gas entering converter 16 to, say, 350° C. If the converter contains an active platinum catalyst. In converter 16 a gas of the noted concentration and pressure can give up to a maximum of 91.5% conversion, in which case its temperature on leaving the converter would be 566° C. Practically, somewhat less conversion and a correspondingly lower temperature will be obtained. This hot gas flows through line 17 to the expansion turbine 5, setting it in motion. The turbine is so designed that under normal operating load it will exhaust a gas at a maximum temperature of about 350° C. When idling, however, as is the case in starting up, the normal temperature drop will not occur. The hot gas leaving this turbine through line 19 is passed into converter 20. As soon as the temperature in line 19 reaches, say, 400° C., which is a suitable entrance temperature for converter 20, the clutch 4 is engaged. If this drops the temperature too much, the valved by-pass 18 is opened to allow hot gas to flow into line 19 and thus raise the temperature. In converter 20 the conversion can rise to a total of about 99.4%, under the conditions cited, giving an exit gas of about 420° C. Under different working conditions, the temperature of this exit gas may have a temperature anywhere between 375 and 450° C. This exit gas passes through line 21 to the second expansion turbine where it expands to atmospheric pressure, dropping in temperature to about 165° C. under the conditions cited.

As soon as the whole apparatus is warmed up and on full operating load clutch 2 can be disengaged and motor 1 stopped, because the power developed by the expansion engines 5 and 6 is sufficient to operate the compressor 3. If too little power is being recovered, power recovery can be increased by dropping the gas strength from the burner; if too much, by increasing the gas strength. Temperature regulation at the entrances to the converters 16 and 20 is easily and quickly obtainable by means of the valved by-passes 14 and 18, and rate of operation and gas strength by suitable manipulation of valves 8 and 11.

Under the conditions cited by way of example; namely, when using an 8% $SO_2$ gas at an initial pressure of 5 atmospheres, absolute, the pressure entering the second converter will be about 2 to 3 atmospheres, absolute.

It is self-evident that for most economical operation the entire system from converter 16 on should be well insulated against heat loss.

It will be understood that my invention is susceptible of wide variation and modification, without departing from the spirit thereof.

Thus, although the principal object of my invention is to improve the efficiency of operation where a multi-stage system of conversion is employed, it will be understood that my invention is applicable also to a single stage system. By cooling the exit sulphur trioxide gases prior to absorption by the aid of an expansion engine according to my invention, sufficient heat energy may be recovered from the gases to operate a compressor, to enable the conversion to be carried out under superatmospheric pressure, with resultant increase in percentage of conversion.

In practice, however, the employment of several stages will be found advantageous, for then the temperature of the exit gases from each stage will not be so high as to preclude the use of an ordinary turbine. It is desirable for most economic operation that the exit gases should not be above 600° C. If higher temperatures are unavoidable, resort must be had to a specially designed turbine having vanes or buckets of special heat-resistant material.

Likewise, it was shown in the above system that the pressure in the converters may be created by burning the sulphur in the burner with compressed air. However, any other system for creating the desired pressure may be resorted to. For instance, the sulphur may be burned by air at substantially atmospheric pressure, and a compressor interposed at some point between the burner and first converter, preferably after the burner gases have passed through the customary cooler where their temperature has been reduced. Indeed, the entire burner-cooler system may be dispensed with, where a cool, purified burner gas at atmospheric pressure is available from some other source. In this case the gas is first compressed and passed through a heating unit, where its temperature is raised to the optimum for entering the first converter.

The pressure under which the conversion is to be effected may vary within wide limits. Increased pressures are favorable both to the efficiency of conversion and of energy-recovery. The maximum operable pressure is determined by the design of the turbine.

Although for the sake of example, I mentioned $SO_2$ gases of 8 to 10% $SO_2$ content, it will be understood that my invention may be operated with gases of other concentration, say from 6% to 12% $SO_2$. The amount of energy recovery may not be the same with each concentration, but the process nevertheless will have its advantages in each case as compared to the practice of the art heretofore.

It will be understood that the layout of apparatus may depart considerably from the preferred layout. For instance, instead of mounting the turbines, compressor, and starting motor on the same shaft, and connecting them by clutches, they may be mounted on individual shafts in any desired or convenient manner, and the power transmitted from one to the other by any suitable system of transmission. The clutches may be dispensed with, and electrical couplings or other control apparatus inserted in their stead. Indeed, it is not essential that the turbines operate the compressor at all. The latter may be operated by suitable engines or electric motors while the power generated by the turbines may be diverted to other useful purposes in the plant.

Nor is the motor 1 an absolute requirement in this system. In lieu thereof, the operation may be started with compressed air from a tank, and as soon as the converter gases begin flowing through the turbine 5, the compressor 3 may be cut in to supply the compressed air thereafter.

On the contrary, the turbines and converters may be further consolidated and mounted on the same shaft inside of a single cylindrical casing, the converters in this case being made in sections which are interspersed on the mounting with suitable turbine rotors.

It will be further understood that in the portions of the layout which are not considered as part of this invention, the representation is merely diagrammatic and is not intended to limit this invention. For instance, in the cooler 13, instead of placing the valve in the by-pass 14, it may be placed immediately following the cooler before the junction of by-pass 14 with line 15, the by-pass 14 being made in this case of sufficiently high resistance to enable the ratio of flow through 13 and 14 to be controlled by the aid of the valve.

Many other variations and modifications will become apparent to those skilled in the art.

I claim:

1. The process of converting a mixture of sulphur dioxide and air into sulphur trioxide, which comprises passing it in series through a plurality of converters containing a catalytic contact material which is adapted to facilitate the oxidation of sulphur dioxide to sulphur trioxide, and passing the gases intermittently as they go from one converter into another through an expansion engine carrying a load, whereby to cool the gases issuing from each preceding converter to the optimum temperature for entering the next succeeding converter.

2. In a multi-stage process for converting sulphur dioxide to sulphur trioxide, the method of controlling the temperature of the gases as they pass from one converter into another, which comprises passing the bulk of the gas through an expansion engine carrying a load whereby to cool the same, and by-passing another portion of the same gases around the engine, and mixing it with the cooled portion prior to entry into the next converter, whereby the temperature of the entire gas mixture is adjusted to the particular temperature desirable for entry into said next converter.

3. In a process for producing sulphuric acid by catalytic oxidation of a sulphur dioxide and air mixture to produce sulphur trioxide and then absorbing the sulphur trioxide in sulphuric acid, the improvement which comprises cooling the sulphur trioxide gases prior to absorption by passing them through an expansion engine carrying a load.

4. A method for the manufacture of sulphuric acid, which comprises entering a hot sulphur-dioxide-air mixture into a catalytic chamber under pressure whereby to oxidize the bulk of the sulphur dioxide to sulphur trioxide, with a consequent rise in temperature, and conducting the exit gases from the catalytic chamber through a gas turbine, whereby to cool the same to a predetermined optional temperature while performing useful work.

5. In the process of manufacturing sulphuric acid by the contact process, wherein hot sulphur burner-gases, containing sulphur dioxide, are passed through a catalytic chamber for conversion into sulphur trioxide, the improvement which comprises entering the burner gases into the catalytic chamber under pressure, passing the hot exit gases from the catalytic chamber through a gas turbine whereby to cool the same while operating the turbine, and causing the turbine to operate a compressor for generating the requisite pressure in the catalytic chamber.

6. In an apparatus for the manufacture of sulphuric acid by the contact process with gases under pressure, the combination of a plurality of converters adapted to catalyze the conversion of sulphur dioxide to sulphur trioxide and a plurality of gas-turbines interposed between said converters, each being adapted to take in the exit gases of one converter and to discharge them at a reduced pressure and temperature into the inlet of the next succeeding converter while simultaneously performing mechanical work at the expense of the energy stored in the exit gases.

7. A combination as in claim 6, including further a gas turbine at the end of the last converter of the series adapted to receive the gases issuing from the last converter and to discharge them at a lower pressure to an absorber.

8. A combination as in claim 6, including further a gas turbine at the end of the last converter of the series adapted to receive the gases issuing from the last converter and to discharge them at lower pressure to an absorber, all of said turbines being mounted on a single shaft.

9. A combination as in claim 6, including further a compressor adapted to raise the pressure in the first converter of the series sufficiently to drive the gases through the series of converters and turbines, the turbines being all jointly connected to a power-transmission means for operating said compressor.

FRED C. ZEISBERG.